(12) United States Patent
Izaki

(10) Patent No.: US 9,933,618 B2
(45) Date of Patent: Apr. 3, 2018

(54) CLEANING APPARATUS AND SYSTEM INCLUDING CLEANING APPARATUS

(71) Applicant: FANUC CORPORATION, Minamitsuru-gun, Yamanashi (JP)

(72) Inventor: Makoto Izaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 210 days.

(21) Appl. No.: 14/874,563

(22) Filed: Oct. 5, 2015

(65) Prior Publication Data
US 2016/0096211 A1 Apr. 7, 2016

(30) Foreign Application Priority Data
Oct. 7, 2014 (JP) .................................. 2014-206658

(51) Int. Cl.
*G02B 27/06* (2006.01)
*B08B 1/00* (2006.01)
*G02B 27/00* (2006.01)

(52) U.S. Cl.
CPC ............ *G02B 27/0006* (2013.01); *B08B 1/00* (2013.01); *B08B 1/001* (2013.01); *B08B 1/003* (2013.01); *B08B 1/006* (2013.01); *B08B 1/008* (2013.01)

(58) Field of Classification Search
CPC ....... G02B 27/0006; B08B 1/00; B08B 1/001; B08B 1/003; B08B 1/006; B08B 1/008; B08B 7/04
USPC .................................................. 15/97.1, 231
See application file for complete search history.

(56) References Cited

U.S. PATENT DOCUMENTS

| 7,273,408 B2* | 9/2007 | Chen ..................... B24B 41/005 451/11 |
| 2004/0103916 A1* | 6/2004 | Davis ........................ B08B 1/00 134/6 |
| 2011/0114117 A1 | 5/2011 | Watanabe |
| 2014/0251535 A1* | 9/2014 | Ishii .................. H01L 21/67132 156/281 |
| 2015/0135452 A1 | 3/2015 | Lin et al. |

FOREIGN PATENT DOCUMENTS

| CN | 1033316868 A | 9/2013 |
| JP | 06064878 | 9/1994 |
| JP | 09234431 | 9/1997 |
| JP | 10309552 A | 11/1998 |

(Continued)

*Primary Examiner* — Monica Carter
*Assistant Examiner* — Katina Henson
(74) *Attorney, Agent, or Firm* — RatnerPrestia

(57) ABSTRACT

A cleaning apparatus includes: an accommodation unit that accommodates a cleaning cloth; a drawing-out unit that draws out the cleaning cloth; a cleaning clot setting mechanism unit including an ascend/descend member that ascends and descend together with the cleaning cloth drawn out by the drawing-out unit; and a projection unit that upwardly projects as far as a position between an ascended position and a descended position of the ascend/descend member. When the ascend/descend member is located at the ascended position, the cleaning cloth can be drawn out, and when the ascend/descend member is located at the descended position, the projection unit engages the cleaning cloth, and a robot causes an optical device to be pressed against the cleaning cloth engaged by the projection unit, thereby cleaning the optical device.

7 Claims, 6 Drawing Sheets

(56) References Cited

FOREIGN PATENT DOCUMENTS

| JP | 2001-75241 A | 3/2001 |
|----|--------------|--------|
| JP | 201170593 A | 4/2011 |
| WO | 2010050217 | 5/2010 |

\* cited by examiner

CLEANING APPARATUS AND SYSTEM INCLUDING CLEANING APPARATUS

BACKGROUND OF THE INVENTION

1. Technical Field

The present invention relates to a cleaning apparatus and also to a system including such a cleaning apparatus.

2. Description of Related Art

A system has been widespread in which a workpiece is imaged by an optical device such for example as a camera attached to a robot, and the imaged image is analyzed to operate the robot. Using such a system for a long period of time tends to cause the optical device, e.g., the lens of the camera to be stained due to external environment or the like, and therefore it is possible that a clear image cannot be imaged. Consequently, analysis of the image becomes unable to be performed satisfactorily. Hence, it may happen that the robot is frequently stopped so that the operating rate of the system is lowered. Thus, in the prior art, it was necessary for the operator to clean the optical device at regular intervals.

In this regard, a cleaning apparatus for automatically cleaning an optical component is disclosed in Japanese Laid-open Patent Publication No. 2001-075241. In Japanese Laid-open Patent Publication No. 2001-075241, a spraying device, a humidifying device, and a wiping device are arranged in the named order along the conveying direction of a conveyor. High-pressure air is sprayed by the spraying device onto an optical component conveyed on the conveyor, subsequently the optical component is humidified by the humidifying device, and finally the optical component is wiped by a wiping member of the wiping device.

However, in Japanese Laid-open Patent Publication No. 2001-075241, since it is necessary to arrange the spraying device, humidifying device and wiping device along the conveying direction of the conveyor, the space occupied by these devices is increased, and therefore the entire system is excessively large.

The present invention has been made in view of such circumstances, and an object thereof is to provide a cleaning apparatus having an increased operating rate without being excessively large and a system including such a cleaning apparatus.

SUMMARY OF THE INVENTION

In order to achieve the above object, according to a first aspect of the present invention, there is provided a cleaning apparatus including: an accommodation unit that accommodates a cleaning cloth; a drawing-out unit that draws out the cleaning cloth from the accommodation unit; a cleaning cloth setting mechanism unit including an ascend/descend member that ascends and descends between the accommodation unit and the drawing-out unit together with the cleaning cloth drawn out by the drawing-out unit; and a projection unit that upwardly projects as far as a position between an ascended position and a descended position of the ascend/descend member, wherein when the ascend/descend member is located at the ascended position, the cleaning cloth can be drawn out, and wherein when the ascend/descend member is located at the descended position, the projection unit engages the cleaning cloth, and cleaning is performed using the cleaning cloth engaged by the projection unit.

According to a second aspect of the invention, the cleaning apparatus according to the first aspect further includes a cleaning liquid ejection unit that ejects a cleaning liquid onto the cleaning cloth in the cleaning cloth setting mechanism unit when the ascend/descend member is located at the ascended position.

According to a third aspect of the invention, there is provided a system including a robot, an optical device, and the cleaning apparatus according to the first or second aspect, wherein the robot causes the optical device to be pressed against the cleaning cloth engaged by the projection unit, thereby cleaning the optical device.

According to a fourth aspect of the invention, in the third aspect, the cleaning apparatus is attached to the robot, and the optical device is located at a fixed position.

According to a fifth aspect of the invention, in the third aspect, the optical device is attached to the robot, and the cleaning apparatus is located at a fixed position.

According to a sixth aspect of the invention, in the fourth aspect, the cleaning apparatus is attachable to and detachable from the robot.

According to a seventh aspect of the invention, in the third aspect, it is configured such that in accordance with a program of the robot, the optical device is cleaned at each predetermined cycle or when the number of detection errors by the optical device exceeds a predetermined number of times.

The above objects, features, and advantages, as well as other objects, features, and advantages, of the present invention will become more apparent from a detailed description of exemplary embodiments of the invention illustrated in the accompanying drawings.

DETAILED DESCRIPTION

Figure 1:
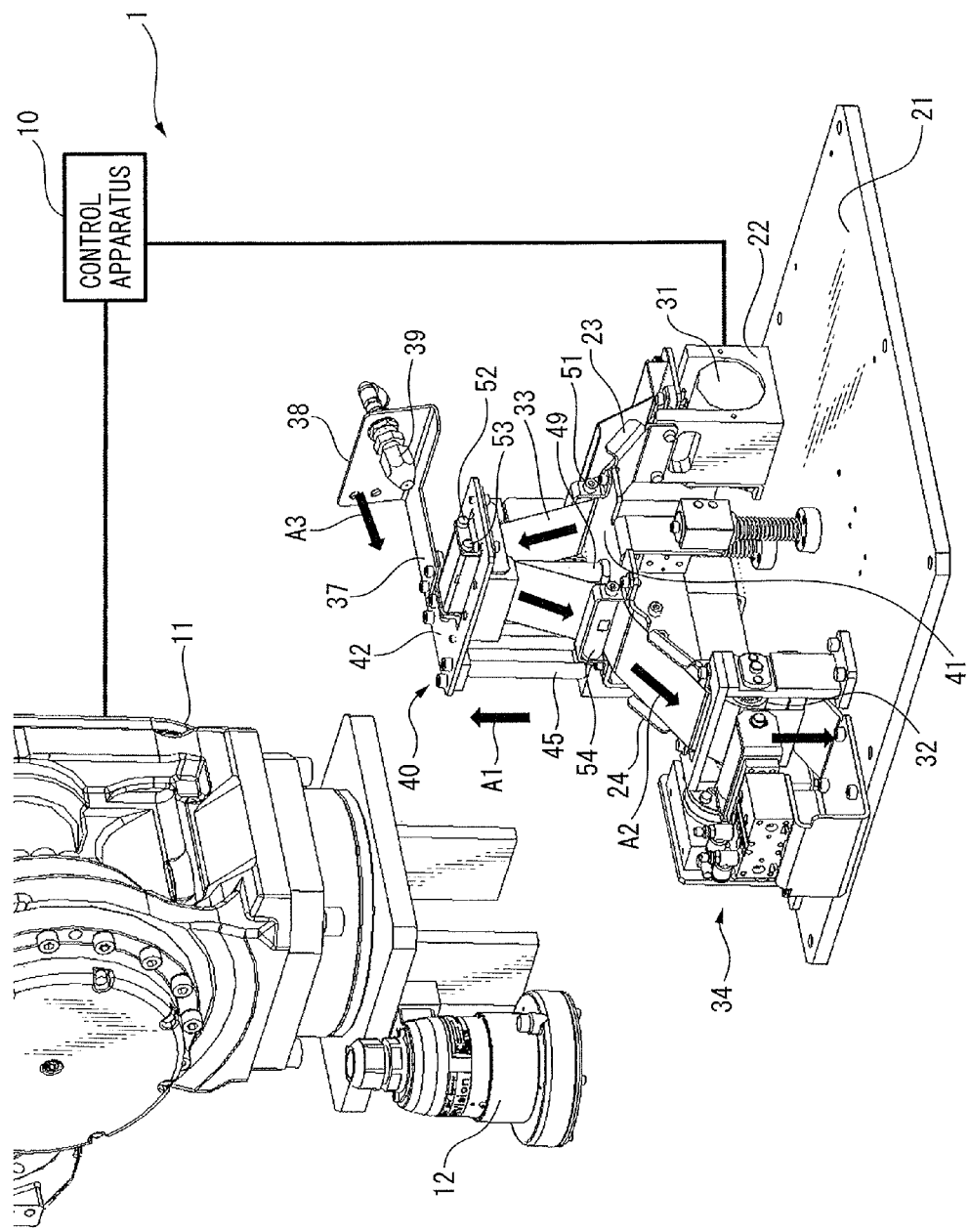
FIG. 1 is a view illustrating a system including a cleaning apparatus and a robot.

Embodiments of the present invention will now be described with reference to the accompanying drawings. Throughout the drawings, like reference numerals are assigned to like members. The scale of the drawings is appropriately changed in order to facilitate understanding.

FIG. 1 is a view illustrating a system including a cleaning apparatus and a robot based on the present invention. The system 1 illustrated in FIG. 1 includes mainly a robot 1, an optical device 12 attached to a hand of the robot 11, and a cleaning apparatus 20 for cleaning the optical device 12. The optical device 12 may be a camera or a visual sensor, and in the following description, it is assumed that the optical device 12 is a camera 12. Further, the robot 11 and the cleaning apparatus 20 are connected to a control apparatus 10 that controls the robot 11 and the cleaning apparatus 20.

Figure 2:
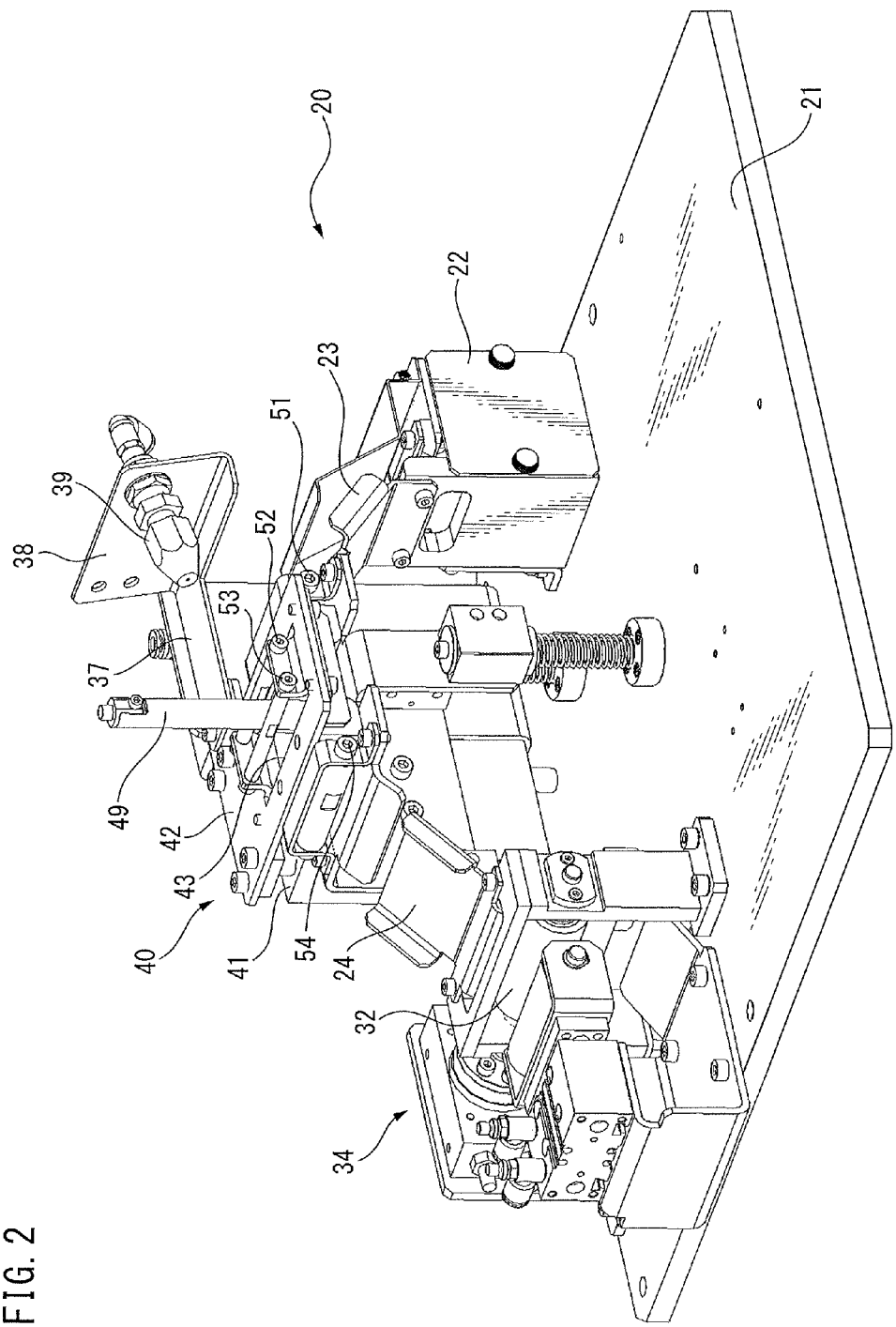
FIG. 2 is a perspective view of the cleaning apparatus illustrated in FIG. 1.
Figure 3:
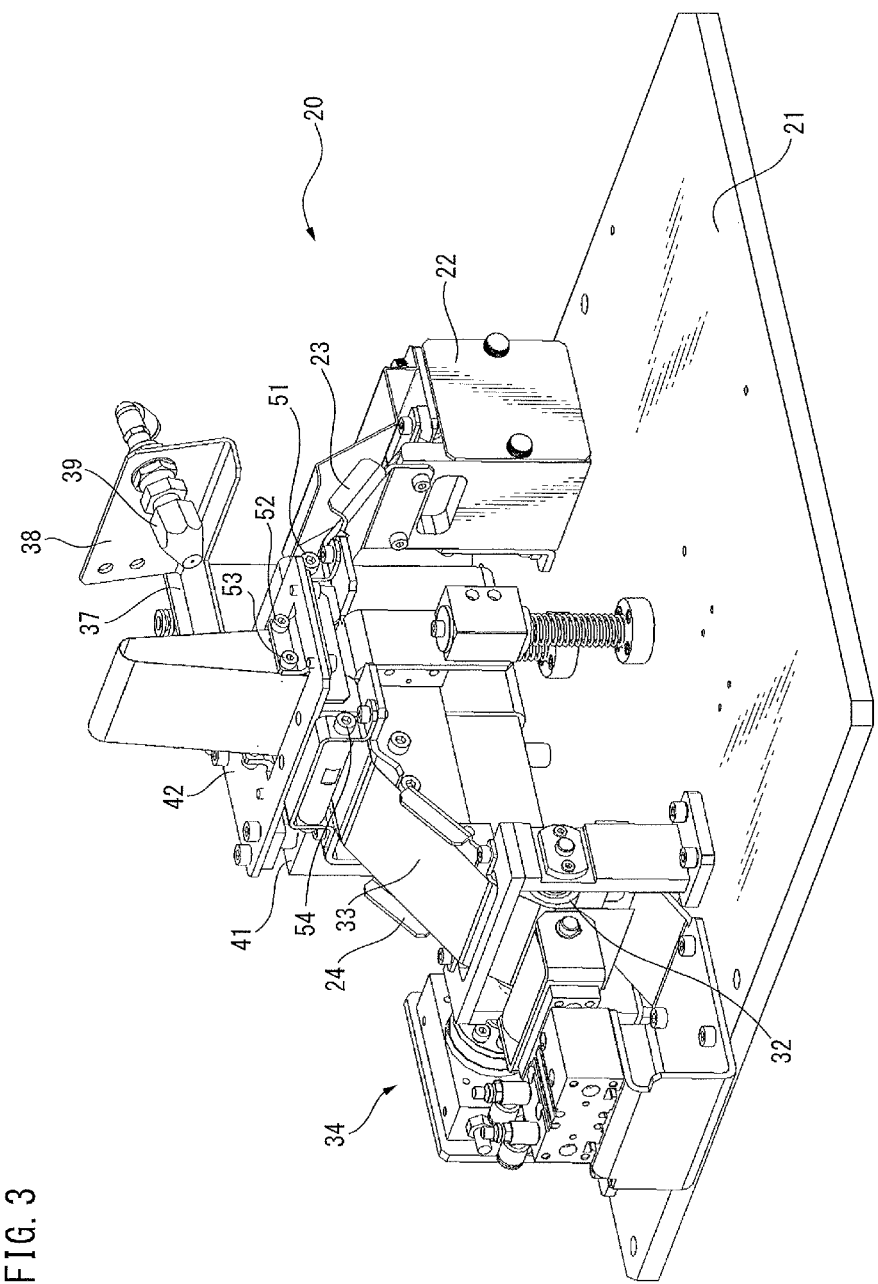
FIG. 3 is another perspective view of the cleaning apparatus illustrated in FIG. 1.

FIG. 2 is a perspective view of the cleaning apparatus illustrated in FIG. 1, and FIG. 3 is another perspective view of the cleaning apparatus 20 illustrated in FIG. 1. The cleaning apparatuses illustrated in FIGS. 2 and 3 are in substantially the same state, and different in that a cleaning cloth 33 illustrated in FIG. 3 is eliminated in FIG. 2.

As illustrated in FIGS. 1 through 3, the cleaning apparatus 20 includes a base 21 having a plurality of openings formed therein. In the illustrated embodiment, the cleaning apparatus 20 is fixed to a floor unit or the like, for example, with bolts or the like inserted through the openings of the base 21.

On the base 21 of the cleaning apparatus 20 is mounted an accommodation unit 22 as illustrated. In the accommodation unit 22, there is accommodated a winding roller 31 for the cleaning cloth 33. Further, on the base 12, there is mounted a drawing-out unit 34 for drawing out the cleaning cloth 33 from the winding roller 31. The drawing-out unit 34 includes a take-up roller 32 onto which the drawn cleaning cloth 33 is wound. The cleaning cloth 33 may be either a woven cloth or a non-woven cloth, and, alternatively, it may be of any other configuration.

Further, a first guide unit 23 is located adjacent to the accommodation unit 22 for causing the cleaning cloth 33 unwound from the accommodation unit 22 to be inclined upwardly. Also, a second guide unit 24 is located adjacent to the drawing-out unit 34 for causing the cleaning cloth 33 to be inclined downwardly.

Further, a cleaning cloth setting mechanism unit 40 is located between the first guide unit 23 and the second guide unit 24. Referring to FIG. 2, the cleaning cloth setting mechanism unit 40 includes mainly a flat unit 41 located at substantially the same height as the upper ends of the first and second guide units 23 and 24, and an ascend/descend member 42 that ascends and descends above the flat unit 41. The ascend/descend member 42 is caused by an ascend/descend unit 45 to ascend and descend between an ascended position depicted in FIG. 1 and a descended position depicted in FIG. 3.

Further, as can be seen from FIG. 2, the ascend/descend member 42 has a substantially rectangular through hole 43 formed at the center thereof. Further, the flat unit 41 is provided with a projection unit 49 that extends through the through hole 43 of the ascend/descend member 42. While the cross section of the projection unit 49 illustrated in FIG. 2 is substantially circular, the cross section of the projection unit 49 may be otherwise shaped, e.g., may be of a rectangular shape proportional to the through hole 43. The projection unit 49 projects upwardly from the flat unit 41 to a position between the ascended position and the descended position of the ascend/descend member 42. Preferably, the projection unit 49 projects as far as a position that is slightly lower than the ascended position of the ascend/descend member 42.

As can be seen from FIGS. 1 and 2, a first roller 51 is provided at one side of the flat unit 41 adjacent to the first guide unit 23. A second roller 52 is provided at one side of the through hole 43 adjacent to the first roller 51, and a third roller 53 is provided at the other side of the through hole 43. In addition, a fourth roller 54 is provided at the other side of the flat unit 41 adjacent to the first guide unit 24.

The cleaning cloth 33, which has been drawn out from the winding roller 31 by the drawing-out unit 34, extends as far as the take-up roller 32 in engagement with all of the first to fourth rollers 51 to 54. As can particularly be seen from FIG. 1, the cleaning cloth 33 passes below the first roller 51, above the second roller 52 and the third rollers 53, and blow the fourth roller 54.

Further, as illustrated in FIG. 1, a bracket 37 extends horizontally from a part of the ascend/descend member 42. Attached to the distal end of the bracket 37 is an inclined member 38. Further, a cleaning liquid ejection unit 39 that ejects a cleaning liquid is mounted perpendicularly to the inclined member 38. It is assumed that the cleaning liquid ejection unit 39 is connected to an unillustrated cleaning liquid source. The cleaning liquid is ejected when the camera 12 contains stains that cannot be removed merely by dry wiping with the cleaning cloth 33, for example.

Figure 4:
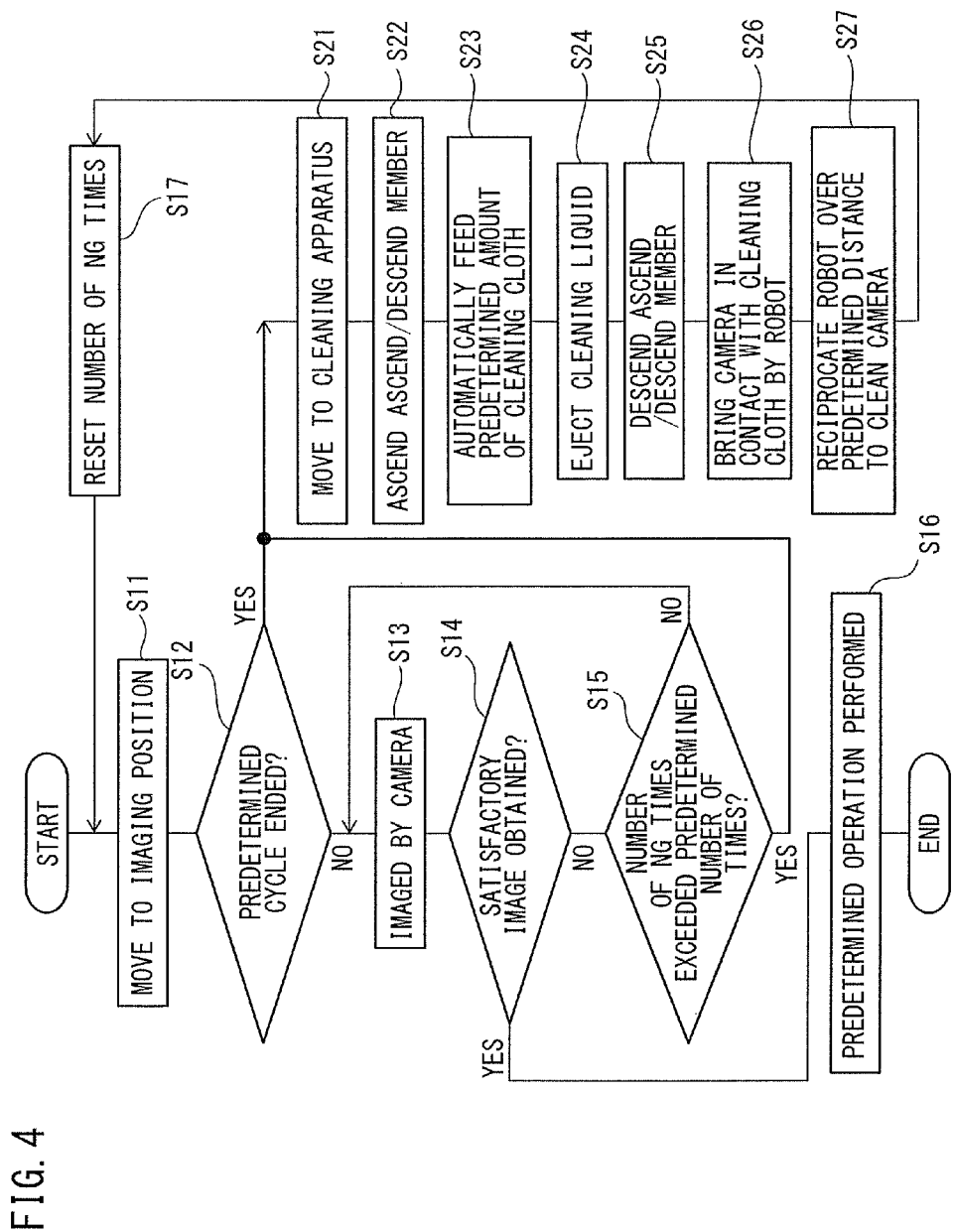
FIG. 4 is a flow chart illustrating the operation of the system including the cleaning apparatus and the robot based on the present invention.
Figure 5:
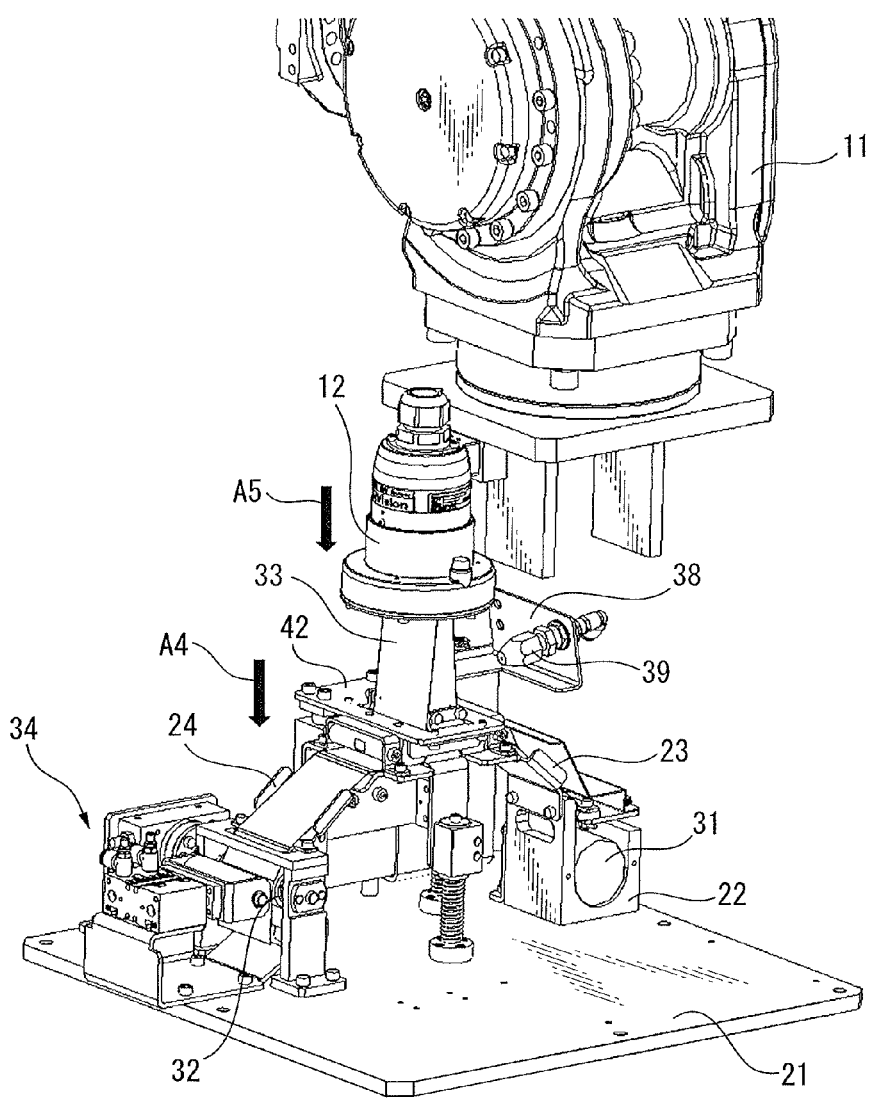
FIG. 5 is a perspective view for explaining the operation of the system.

FIG. 4 is a flow chart illustrating the operation of the system including the cleaning apparatus and the robot based on the present invention. Further, FIG. 5 is a perspective view for explaining the operation of the system. With reference to these drawings, description will now be made of the operation of the system including the cleaning apparatus of the present invention. Meanwhile, it is assumed that the operation illustrated in FIG. 4 is performed at each predetermined control cycle.

Initially, at step S11 of FIG. 4, the robot 11 is driven to move the camera 12 to an imaging position. The imaging position is a position above an unillustrated workpiece, for example. Subsequently, at step S12, a determination is made as to whether a predetermined cycle has ended or a predetermined time has elapsed. The predetermined cycle refers to the cycle or another predetermined cycle of a predetermined operation performed using the robot 11 and the camera 12. When the predetermined cycle has not ended or when the predetermined time has not elapsed, the procedure proceeds to step S13.

At step S13, a workpiece or the like is imaged by the camera 12. At step S14, a determination is made as to whether the imaged image is satisfactory. Whether an image is satisfactory is determined based on whether image processing can be appropriately performed by an image processing unit (not illustrated) in the control apparatus 10, for example. When a satisfactory image is acquired, it can be determined that the camera 12 is not stained at all. In such an instance, the procedure proceeds to step S16, and the predetermined operation is performed.

In contrast, when it is determined at step S14 that the image is unsatisfactory, the procedure proceeds to step S15. At step S15, a determination is further made as to whether the number of NG times that it is determined that the image is unsatisfactory exceeds a predetermined number of times. It is assumed that the number of NG times is stored in a storage unit (not illustrated) of the control apparatus 10. When the number of NG times is not in excess of the predetermined number of times, it can be determined that the camera 12 is not so stained and that a satisfactory image could not be acquired due to another external factor. In such an instance, the procedure returns to step S13, and the camera 12 picks up an image again.

In contrast, when the number of NG times exceeds the predetermined number of times at step S15, it can be determined that the camera 12 is considerably stained. Meanwhile, at step S12, when the predetermined cycle has ended or the predetermined time has elapsed, it can be determined that the staining of the camera 12 has progressed. In such instances, the procedure proceeds to step S21, and the camera 12 is cleaned by the cleaning apparatus 20.

At step S21, initially, the robot 11 is driven so that the camera 12 is moved to a neighborhood of the cleaning apparatus 20. Further, at step S22, the ascend/descend member 42 of the cleaning cloth setting mechanism unit 40 is ascended to the above-mentioned ascended position in the direction of arrow A1 in FIG. 1. In this manner, the cleaning cloth 33 becomes out of engagement with the distal end of the projection unit 49. Thus, when the drawing-out unit 34 is driven at step S23, a predetermined amount of the cleaning cloth 33 can be drawn out in the direction of arrow A2

Subsequently, at step S24, a predetermined quantity of the cleaning liquid is ejected from the cleaning liquid ejection unit 39. As can be seen from FIG. 1, the cleaning liquid is ejected onto the cleaning cloth 33 between the second roller 52 and the third roller 53, i.e., the cleaning cloth 33 at the position corresponding to the distal end of the projection unit 49. Meanwhile, when it is determined that the degree of the staining of the camera 12 is not so high, the processing at step S24 may be omitted.

Subsequently, at step S25, the ascend/descend member 42 is descended to the above-mentioned descended position in the direction of arrow A4 in FIG. 5. In this manner, as will be appreciated from a comparison of FIGS. 2, 3, and 5, the projection unit 49 is caused to project from the through hole 43 of the ascend/descend member 42, with the cleaning cloth 33 being engaged with the distal end of the projection unit 49. When the ascend/descend member 42 is located at the descended position, the distal end of the projection unit 49 is engaged with the cleaning cloth 33 so that the cleaning cloth 33 is prevented from moving.

Subsequently, at step S26, as illustrated by arrow A5 in FIG. 5, the robot 11 is driven so as to dispose the camera 12 into contact with the cleaning cloth 33 engaged with the distal end of the projection unit 49. Then, at step S27, with the cleaning cloth 33 being disposed in contact with the camera 12, the robot 11 is reciprocated horizontally over a predetermined distance, so that the camera 12 is cleaned. Meanwhile, the robot 11 may clean the camera 12 by another operation.

Referring again to FIG. 4, the procedure proceeds to step S17 when the camera 12 is cleaned. At step S17, since the camera 12 has already been cleaned, the number of NG times used at step S15 is reset to zero. Then, the procedure returns to step S11.

In this manner, in the present invention, the camera 12 is automatically cleaned at regular intervals through use of the cleaning apparatus 20. Thus, it is possible to always keep the camera 12 in a non-stained state. Consequently, it is possible to prevent an image from not being analyzed and to prevent the robot from being stopped. In the present invention, therefore, the operation rate of the system 1 can be increased. Also, the burden of the operator can be reduced since there is no need for the operator to manually clean the camera 12.

Further, the cleaning apparatus 20 of the present invention is not required to include a spraying device, humidifying device, and wiping device of the conventional technique. Thus, the cleaning apparatus 20 of the present invention is small-sized as compared with the apparatus of the conventional technique in which a spraying device, humidifying device, and wiping device are arranged along the feeding direction of a conveyor. In this manner, in the present invention, the system 1 can be prevented from becoming large-sized.

In a factory or the like, a plurality of like robots each equipped with a camera 12 may work. As will be appreciated, even in such an instance, a plurality of the cameras 12 can be cleaned sequentially through use of the single cleaning apparatus 20 of the present invention.

Figure 6:
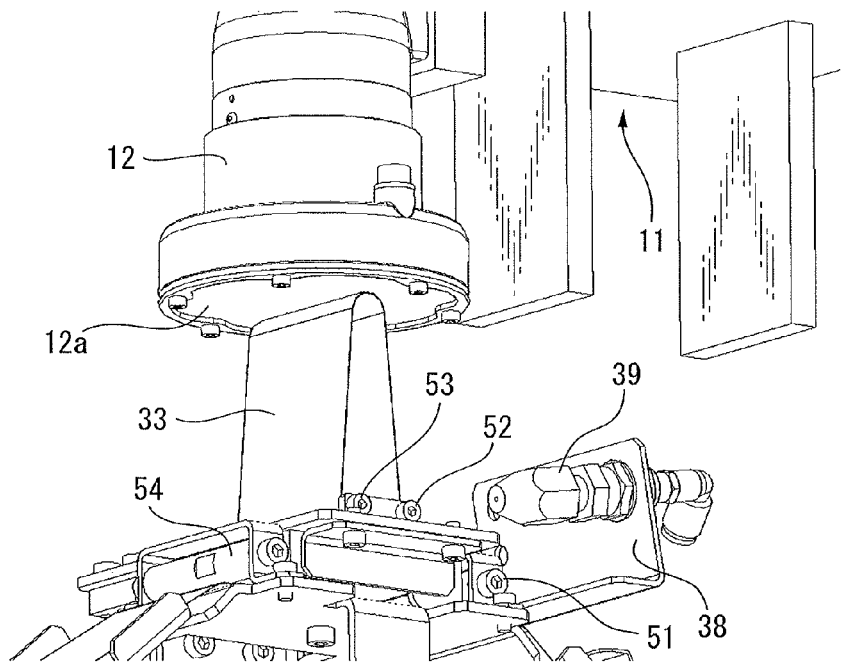
FIG. 6 is a first perspective view for the optical device being cleaned.
Figure 7:
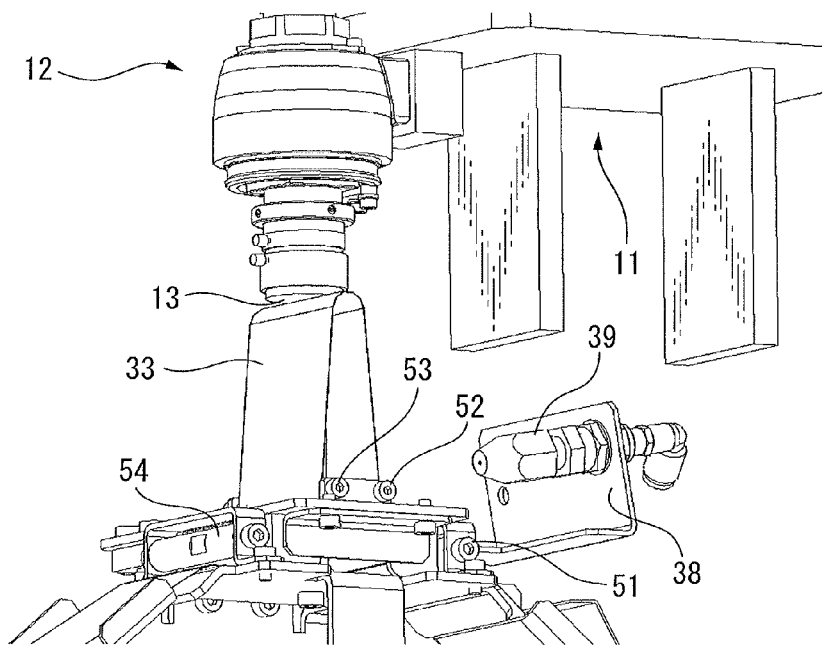
FIG. 7 is a second perspective view for the optical device being cleaned.

FIGS. 6 and 7 are perspective views for the optical device being cleaned. As seen from these figures, a lens 13 (optical component) of the camera 12 is usually covered with a light-transmitting cover 12a. In FIG. 6, the cleaning apparatus 20 is cleaning the cover 12a of the camera 12, whereas in FIG. 7, the cleaning apparatus 20 is directly cleaning the lens 13 of the camera 12, with the cover 12a of the camera 12 being removed. As such, the cleaning apparatus 20 of the present invention may clean the cover 12a or may clean the lens 13. As a matter of course, the cleaning apparatus 20 can also clean another part of the camera 12 or a part such, for example, as the hand of the robot 11.

In the embodiment illustrated in FIG. 1 or the like, the camera 12 is attached to the robot 11, and the cleaning apparatus 20 is fixed. However, in an unillustrated embodiment, the cleaning apparatus 20 may be attached to the robot 11 with bolts or the like inserted through the openings of the base 21, and the camera 12 may be fixed to a floor unit or the like. In such an instance, the cleaning apparatus 20 is moved to an arbitrary position by the robot so that even when a plurality of cameras 12 are fixed, the single cleaning apparatus 20 can clean the plurality of cameras 12.

The cleaning apparatus 20 may be mounted to the floor unit or robot 11 by means other than inserting bolts through the openings of the base 21. Preferably, the cleaning apparatus 20 is attachable and detachable. In such an instance, the single cleaning apparatus 20 is fixed to the floor unit or the like and cleans the camera 12 provided on the robot 11. Also, it is possible that the cleaning apparatus 20 may be detached from the floor unit and attached to the robot 11 to clean the camera 12 that is separately fixed.

Advantage of the Invention

In the first embodiment, there can be provided the cleaning apparatus that is small-sized as compared with the apparatus of the conventional technique in which a spraying device, a humidifying device, and a wiping device is arranged along the conveying direction of a conveyor.

In the second embodiment, since the cleaning liquid is used, it is possible to cope with stains that cannot be removed merely by dry wiping.

In the third embodiment, since the optical device such, for example, as the camera can be cleaned by the cleaning apparatus, there is no possibility that the optical device is stained and that the robot is stopped due to becoming unable to analyze an image; thus, the operating rate of the system can be increased. Further, since there is no need for the operator to manually clean the optical device, the burden of the operator can be reduced. Further, since the cleaning apparatus is relatively small-sized, the system can be avoided from becoming large-sized.

In the fourth embodiment, since the cleaning apparatus can be moved to an arbitrary position by the robot, a plurality of optical devices can be cleaned by the single cleaning apparatus even when the plurality of optical devices are fixed.

In the fifth embodiment, even when there are a plurality of robots each equipped with an optical device, the plurality of optical devices can be cleaned by the single cleaning apparatus.

In the sixth embodiment, since the cleaning apparatus is attachable and detachable, both the optical camera provided on the robot and the optical device located at a fixed position can be cleaned using the cleaning apparatus.

In the seventh embodiment, since the optical device can be automatically cleaned, it is possible to keep the optical device at all times in a state in which it is not stained.

While the present invention has been described with reference to exemplary embodiments thereof, it will be appreciated by those skilled in art that the above-mentioned changes, as well as various other changes, omissions, and additions, are possible without departing from the scope of the present invention.

What is claimed is:

1. A cleaning apparatus comprising:
an accommodation unit that accommodates a cleaning cloth;
a drawing-out unit that draws out the cleaning cloth from the accommodation unit;
a cleaning cloth setting mechanism unit located between the accommodation unit and the drawing-out unit;
wherein the cleaning cloth setting mechanism unit includes a flat unit,
an ascend/descend member that ascends and descends above the flat unit together with the cleaning cloth drawn out by the drawing-out unit;
a projection unit that projects from the flat unit to a projected position between the ascended position and the descended position of the ascend/descend member; and wherein the ascend/descend member is moved along the length of the projection unit vertically;
wherein when the ascend/descend member is in the ascended position, it extends to a top end of the projection unit; wherein when the ascend/descend member is in the descended position, the projection unit extends above the ascend/descend member, wherein the ascend/descend member is located at a base of the projection unit;
a processor configured to:
move the ascend/descend member relative to the flat unit and the projection unit to the ascended position, the cleaning cloth becomes out of engagement with a distal end of the static projection unit,
feed a predetermined amount of the cleaning cloth while the ascend/descend member is being moved to the ascended position,
eject cleaning liquid onto the cleaning cloth when the ascend/descend member is in the ascended position, and
after ejecting the cleaning fluid, move the ascend/descend member relative to the flat unit and the projection unit to the descended position, the projection unit remains in the projected position and engages the cleaning cloth, the cleaning cloth is prevented from moving and cleaning is performed using the cleaning cloth engaged by the projection unit.

2. The cleaning apparatus according to claim 1, further comprising a cleaning liquid ejection unit that ejects a cleaning liquid onto the cleaning cloth at the cleaning cloth setting mechanism unit when the ascend/descend member is located at the ascended position.

3. A system comprising:
a robot;
an optical device; and
the cleaning apparatus set forth in claim 1,
wherein when the ascend/descend member is located at the descended position, the robot causes the optical device to be pressed against the cleaning cloth engaged by the projection unit, thereby cleaning the optical device.

4. The system according to claim 3, wherein the cleaning apparatus is attached to the robot, and the optical device is located at a fixed position.

5. The system according to claim 3, wherein the optical device is attached to the robot, and the cleaning apparatus is located at a fixed position.

6. The system according to claim 4, wherein the cleaning apparatus is attachable to and detachable from the robot.

7. The system according to claim 4, wherein in accordance with a program of the robot, the optical device is cleaned at each predetermined cycle or when the number of detection errors by the optical device exceeds a predetermined number of times.

* * * * *